United States Patent Office 3,337,424
Patented Aug. 22, 1967

3,337,424
PURIFICATION OF m- AND p-CRESOL BY AZEOTROPIC DISTILLATION WITH A HYDROCARBON ENTRAINER
Martin B. Neuworth and Donald C. Jones, Pittsburgh, Pa., assignors, by mesne assignments, to Consolidation Coal Company, a corporation of Delaware
No Drawing. Filed Sept. 27, 1965, Ser. No. 490,688
5 Claims. (Cl. 203—44)

The present invention relates to the purification of m,p-cresol, and more particularly, to a process for obtaining m,p-cresol in high purity and yield from mixtures thereof with other close boiling phenols.

Meta-cresol and para-cresol have, for all practical purposes, the same boiling point, i.e. 202° C. at 760 mm. The fractional distillation of coke oven tars or of petroleum cresylic acids yields a distillate fraction which is rich in a mixture of these two cresols, about 85 to 90 percent by weight of the fraction. The ratio of meta- to para-cresol in the mixture varies widely, but one frequently recovered has a meta- to para-ratio of about 2/1.

For many uses, the inseparability of meta-cresol and para-cresol is of little concern since for such uses they function essentially as equivalents. One such use is as intermediates in the production of cresyl phosphates, commonly used as stabilizing additives for gasoline and hydraulic fluids.

A problem has recently arisen in connection with such use. The phosphates formed by reaction with the impurities present in the m,p-cresol fraction are tobic. At least some of them are, in particular the esters of o-cresol and of o-ethylphenol. Both of these phenols occur in small amounts in the m,p-cresol fraction, along with 2,4-xylenol, 2,5-xylenol and 2,6-xylenol. The reason these phenols appear in the m,p-cresol fraction will be apparent from their boiling points, tabulated in the following Table I:

TABLE I

|  | Boiling Points (° C.) | |
| --- | --- | --- |
|  | 50 mm. | 760 mm. |
| o-Cresol | 110.5 | 191 |
| m-Cresol | 122 | 202 |
| p-Cresol | 122 | 202 |
| o-Ethylphenol | 121 | 204 |
| 2,4-xylenol | 127 | 210 |
| 2,5-xylenol | 127 | 210 |
| 2,6-xylenol | 116.5 | 201 |

Simple fractional distillation is not an economically feasible way to recover pure (i.e. 95 percent or better) m,p-cresol from such close boiling phenols. For example, when a mixture containing 84.8% m,p-cresol, 0.9% phenol, 1.5% o-cresol, 1.0% 2,6-xylenol, 3.5% o-ethylphenol and 8.4% 2,4-, 2,5-xylenol was fractionated in a 25 theoretical plate column under the most favorable conditions, i.e. very high reflux ratios (greater than 40/1) and 50 mm. Hg pressure, the recovery of m,p-cresol of 95% purity and containing less than 1% o-ethylphenyl was only 30 to 40 percent.

Accordingly, the primary object of this invention is to provide a commercially feasible process for recovering m,p-cresol in high yield and high purity from distillate fractions containing principally m,p-cresol.

Another object of the invention is to provide a process for removing o-ethylphenol from its admixture with m,p-cresol.

In accordance with our invention, we have provided a process for purifying an m,p-cresol distillate fraction which comprises:

(a) Adding sufficient amount of a hydrocarbon boiling between 150 and 250° C. to the m,p-cresol fraction to form an azeotrope with the m,p-cresol, (b) Fractionally distilling the mixture from step (a) to recover said azeotrope, and (c) Recovering m,p-cresol from said azeotrope.

Our process is based upon our discovery that:

(1) Hydrocarbons boiling from 150 to 250° C. form minimum boiling azeotropes with m,p-cresol. For example, we have shown that tetralin (a hydroaromatic hydrocarbon), diisopropylbenzene (an aromatic hydrocarbon) and n-dodecane (a paraffinic hydrocarbon) all form minimum boiling azeotropes with m,p-cresol, and (2) The minimum boiling azeotropes with m,p-cresol are readily separable by fractional distillation from the phenolic impurities in the m,p-cresol fraction, with the exception of o-cresol. However, the failure to remove o-cresol is not serious, since it can be removed, in contrast to the other impurities, by fractional predistillation of the m,p-cresol.

Straight-chain paraffin hydrocarbons in the range of $C_{10}$ to $C_{13}$ are preferred for the purposes of this invention because the resulting azeotropes with m,p-cresol are rich in m,p-cresol and require minimum reflux ratios for separation from o-ethylphenol and the other phenolic impurities. These straight-chain paraffins in the indicated range are available at low cost. In addition, the hydrocarbon can be separated from the m,p-cresol by single-stage batch contacting with aqueous methanol, thus avoiding the need for caustic extraction. The aromatic and the hydroaromatic hydrocarbons are more soluble in aqueous methanol and thus require the more complex processing of caustic extraction.

The following Table II lists the boiling points and compositions of azeotropes of certain n-paraffins and the phenols commonly found in m,p-cresol distillate fractions.

TABLE II.—BOILING POINT, COMPOSITION OF AZEOTROPES OF n-PARAFFINS AND PHENOLS

| | | Pressure: 400 mm. Hg | | | | |
|---|---|---|---|---|---|---|
| | | Phenol | | | | |
| Hydrocarbon | B.P., °C. | o-Cresol | 2,6-xylenol | m,p-Cresol | o-EP [2] | 2,4-2,5 [3] |
| | | 168.5 | 178 | 181 | 182 | 186 |
| n-Decane | 150.5 | 149 (23) | 152.5 (4) | 150 (15) | 152.5 (7) | |
| n-Undecane | 172 | 160.5 (45) | 169 (36) | 164 (33) | 168.5 (31) | 171 (22) |
| n-Dodecane | 191 | 167 (72) | 177 (72) | 173 (53) | 177.5 (61) | 181.5 (49) |
| n-Tridecane | 210 | | | 178.5 (75) | 182 (85) | |
| n-Tetradecane | 228 | | | 181 (93) | | |

| | | Pressure: 50 mm. Hg | | | | |
|---|---|---|---|---|---|---|
| | | Phenol | | | | |
| Hydrocarbon | B.P., °C. | o-Cresol | 2,6-xylenol | m,p-Cresol | o-EP [2] | 2,4-2,5 [3] |
| | | 110.5 | 116.5 | 122 | 121+ | 127 |
| n-Decane | 90.5 | 89 (18) | 92 (5) | 90 (10) | | |
| n-Undecane | 110 | 101.5 (41) | 107 (34) | | | |
| n-Dodecane | 127 | 107.5 (66) | 115.5 (68) | 133 (48) | 116 (54) | 119.5 (44) |
| n-Tridecane | 143.5 | | | 119 (70) | 120+ (82) | |
| n-Tetradecane | 159 | | | | | |

[1] Figures in parentheses are weight percent phenolic compound.
[2] Ortho-ethylphenol.
[3] 2,4-, 2,5-xylenol.

It is clear from the above Table II that the hydrocarbons of this invention form azeotropes with all the phenols and not just the m,p-cresol. However, it is clear that difference in boiling points is not sufficient to explain the separation which we obtain, as will be later shown. We have concluded that the hydrocarbon has a marked depressant effect upon the volatility of the phenol contaminants, especially o-ethylphenol and the three xylenols, 2,4-xylenol, 2,5-xylenol and 2,6-xylenol. In other words, the effective boiling points of these phenols are significantly higher than that of the m,p-cresol hydrocarbon azeotrope. This significant elevation of boiling point is not true of o-cresol. So, prior removal of o-cresol by straight fractionation followed by azeotropic distillation permits the recovery of m,p-cresol in 99.5% purity in a yield in excess of 90%. If a column with about 25 theoretical plates is used, modest reflux ratios averaging about 4/1–5/1 are sufficient. It would be necessary to use ratios of 20/1–30/1 to effect the same degree of separation of 2,6-xylenol from m,p-cresol by straight fractionation. Ratios of 10/1–15/1 would be required for the separation of 2,4-, 2,5-xylenol from m,p-cresol by straight fractionation.

The invention is illustrated in the following examples.

*Example 1*

A meta-, para-cresol distillate fraction was used which contained 95% by weight of m,p-cresol, 2.7% by weight o-ethylphenol, 2.3% by weight of 2,4-, 2,5-xylenol, a trace of o-cresol and a trace of 2,6-xylenol. The ratio of meta- to para-cresol in the fraction was about 2.5. Four hundred grams of n-dodecane (Phillips technical grade, 95 mole percent min. purity) and 350 grams of the m,p-cresol fraction were charged to a 1" x 3.5' Cannon-packed column having about 25 theoretical plates. The mixture was fractionally distilled at about 400 mm. Hg. About 95 percent of the m,p-cresol in the form of the azeotrope was recovered at reflux ratios of about 4 to 1. The recovered azeotrope contained about 0.2 percent by weight of o-ethylphenol (based on m,p-cresol), traces of o-cresol and 2,6-xylenol, and 2,4-, 2,5-xylenol. The m,p-cresol was recovered from its azeotrope by extraction with aqueous methanol (60 weight percent methanol concentration) at a volume ratio of aqueous methanol to azeotrope of 0.8. The percent recovery of m,p-cresol was 97.6. We have found that in such extractions, the effect of methanol concentration is negligible, but a range of about 50 to 70 percent is suitable. In the case of the volume ratio of aqueous methanol to azeotrope, however, we have found that as the ratio is reduced from 0.8 to 0.1, the recovery of m,p-cresol drops from 97+ percent to 94+ percent.

*Example 2*

The m,p-cresol used in this example contained 0.4% o-cresol, 1.1% 2,6-xylenol, 89.3% m,p-cresol, 4.5% o-ethylphenol and 4.7% 2,4-, 2,5-xylenol. The hydrocarbon used was a mixture of n-$C_{10}$–$C_{13}$ paraffins from Continental Oil Company which contained 16.5% n-decane, 37.6% n-undecane, 41.0% n-dodecane, 2.2% n-tridecane and 2.7% unidentified hydrocarbons.

Three hundred grams of the m,p-cresol fraction and 375 grams of the n-$C_{10}$–$C_{13}$ hydrocarbons were charged to a 1" x 3½', 25 theoretical plate, Cannon-packed column and brought to reflux at 400 mm. Hg. After 10 minutes at total reflux, distillate fractions were removed at various reflux ratios starting at 1/1 and ending at 7.5/1. Each of the fractions was analyzed by vapor phase chromatography (VPC). Details of the fractionation and analyses are contained in Table III.

TABLE III.—AZEOTROPIC FRACTIONATION OF m,p-CRESOL WITH n-$C_{10}$-$C_{13}$ PARAFFINS

| Cut No. | Reflux Ratio | Distillate | | Cresols, Weight Percent of Cresols Charged | Composition of Cresols, Wt. percent of Each Fraction | | | | | Composition of Cresols, Wt. Percent of Cresols Charged | | | | |
|---|---|---|---|---|---|---|---|---|---|---|---|---|---|---|
| | | Weight Percent | Weight Percent Cresols | | o-Cresol | 2,6-xylenol | m,p-Cresol | o-EP [1] | 2,4-, 2,5 [2] | o-Cresol | 2,6-xylenol | m,p-Cresol | o-EP [1] | 2,4-, 2,5 [2] |
| 1 | 1/1 | 5.69 | 15.5 | 1.98 | 2.8 | | 97.2 | | | 0.06 | | 1.92 | | |
| 2 | 2/1 | 11.48 | 29.3 | 7.53 | 1.6 | | 98.4 | | | 0.12 | | 7.41 | | |
| 3 | 4/1-5/1 | 11.85 | 31.2 | 8.27 | 1.2 | | 98.8 | | | 0.10 | | 8.17 | | |
| 4 | 6/1 | 12.26 | 37.6 | 10.26 | 1.0 | | 99.0 | | | 0.10 | | 10.16 | | |
| 5 | 6/1 | 12.57 | 47.0 | 13.21 | 0.2 | | 99.8 | | | 0.03 | | 13.18 | | |
| 6 | 6/1 | 5.82 | 52.6 | 6.85 | Tr. | 0.2 | 99.8 | | | Tr. | 0.01 | 6.84 | | |
| 7 | 6/1 | 12.74 | 52.6 | 14.99 | | 0.2 | 99.6 | 0.2 | | | 0.03 | 14.93 | 0.03 | |
| 8 | 6/1 | 6.35 | 53.8 | 7.63 | | 0.4 | 98.6 | 1.0 | | | 0.03 | 7.52 | 0.08 | |
| 9 | 7.5/1 | 6.40 | 54.4 | 7.80 | | 1.8 | 96.8 | 1.4 | | | 0.14 | 7.55 | 0.11 | |
| 10 | 7.5/1 | 3.24 | 53.9 | 3.91 | | 1.4 | 97.0 | 1.6 | | | 0.06 | 3.80 | 0.06 | |
| 11 | 7.5/1 | 3.63 | 55.4 | 4.50 | | 3.3 | 92.2 | 4.5 | | | 0.15 | 4.15 | 0.20 | |
| 13H | | 2.26 | 65.4 | 3.32 | | 5.1 | 55.8 | 33.4 | 5.7 | | 0.17 | 1.85 | 1.11 | 0.19 |
| 12R | | 5.71 | 76.2 | 9.75 | | 5.0 | 8.8 | 31.6 | 54.6 | | 0.49 | 0.86 | 3.08 | 5.32 |
| Totals | | 100.00 | | 100.00 | | | | | | 0.41 | 1.08 | 88.34 | 4.67 | 5.51 |

[1] Ortho-ethylphenol.  [2] 2,4-, 2,5-xylenol.

The calculated compositions of the cresols in composite fractions 1-7 inclusive, 1-9 inclusive, 1-10 inclusive and 1-11 inclusive are shown below in Table IV with the calculated recovery of m,p-cresol:

TABLE IV

| Composite of fractions | 1-7 | 1-9 | 1-10 | 1-11 |
|---|---|---|---|---|
| Percent Recovery of m,p-Cresol | 71 | 88 | 92+ | 98+ |
| o-Cresol | 0.65 | 0.52 | 0.50 | 0.47 |
| 2,6-xylenol | 0.06 | 0.27 | 0.33 | 0.48 |
| m,p-Cresol | 99.24 | 98.93 | 98.83 | 98.50 |
| o-Ethylphenol | 0.05 | 0.28 | 0.34 | 0.55 |

Meta-, para-cresol was recovered from composite fractions 1-11, inclusive Table III, by extraction with 0.6 volumes 60 weight percent aqueous methanol per volume of azeotrope. The upper, hydrocarbon layers in each case were analyzed by VPC while the lower, aqueous layers were charged to a 1″ x 3′ Vigreux column for removal of methanol, water and small amounts of hydrocarbon. The recovery of m,p-cresol was 94 percent in each case. In order to demonstrate an ultimate recovery of m,p-cresol, the aqueous methanol distillates were used again to extract fresh azeotrope. This time, the recoveries of m,p-cresol were quantitative. Three hundred ml. (254.4 grams) of a composite of fractions 1-11 inclusive (Table III) was contacted wtih 180 ml. (159.0 grams) of 60 weight percent aqueous methanol. The azeotrope contained 42.15 percent cresols. After settling and phase separation, the upper hydrocarbon layer weighed 143.9 grams and contained 0.4 percent MeOH, 0.9 percent cresols and 98.7 percent hydrocarbon by VPC analysis. The lower layer was distilled in a 1″ x 3′ Vigreux column at one atmosphere to a head temperature of 184° C. and a pot temperature of 200° C. The residue weighed 100.2 grams, contained no hydrocarbon detectable by VPC and represented 94 percent of the cresols charged to extraction. The distillate weighed 168.5 grams and contained a small hydrocarbon layer and a milky aqueous layer. It was thoroughly mixed and charged (167.9 grams) to a second extraction with fresh azeotrope, 300 ml. (254.0 grams). After settling and phase separation, the upper hydrocarbon layer weighed 146.9 grams and contained 0.3 percent MeOH, 0.7 percent cresols and 99.0 percent hydrocarbon by VPC analysis. The lower layer, which weighed 274.6 grams, was distilled in the 1″ x 3′ Vigreux column to a head temperature of 179° C., pot temperature of 201° C. The residue weighed 107.0 grams, contained no hydrocarbon detectable by VPC analysis and represented 100 percent of cresols charged to a second extraction. The distillate, which weighed 166.5 grams, was centrifuged yielding 3.35 grams of an upper layer which analyzed 100 percent hydrocarbon by VPC. The lower layer, which weighed 163.1 grams, contained by difference 6.8 grams cresols or a concentration of 4.1-4.2 weight percent.

*Example 3*

A mixture containing 150 grams of meta-, para-cresol (0.4% o-cresol, 1.1% 2,6-xylenol, 89.3% m,p-cresol, 4.5% o-ethylphenol and 4.7% 2,4-, 2,5-xylenol) and 200 grams of an aliphatic naphtha (boiling range and properties shown in the following Table V) was fractionated at 400 mm. Hg in a 1″ x 3½′ Cannon-packed column using reflux ratios of 4/1 to 7.5/1. The yield of m,p-cresol was 84 percent with a purity of 98+ percent.

TABLE V

| Sp. Gr. at 60° F | 0.8100 |
|---|---|
| Pounds per gallon | 6.744 |
| Aniline Cloud Pt., °F | 145 |
| Kauri-Butanol No., cc | 34.4 |

| ASTM Distillation: | °F | °C |
|---|---|---|
| IBP | 370 | 188 |
| 5 | 376 | 191 |
| 50 | 398 | 203 |
| 95 | 441 | 227 |
| Dry End Point | 458 | 237 |
| ASTM End Point | 462 | 239 |

In similar fashion, purification of m,p-cresol fractions was effected using tetralin, 1,3-diisopropyl benzene, and trans-decalin, respectively as the azeotropic agent. The following Table VI tabulates the boiling points and compositions of the azeotropes.

TABLE VI.—AZEOTROPES OF m,p-CRESOL AND 1,3-DIISOPROPYL BENZENE, TETRALIN AND TRANS-DECALIN

[Boiling points and compositions]

| | B.P., °C./ 760 mm. Hg | Azeotrope | |
|---|---|---|---|
| | | B.P., °C./ mm. Hg | Composition, percent m,p-Cresol |
| 1,3-diisopropyl Benzene | 202 | | |
| 50 mm. Hg | | 112 | 28 |
| 600 mm. Hg | | 188 | 42 |
| Tetralin | 207 | | |
| 50 mm. Hg | | 114 | 31 |
| 200 mm. Hg | | 155 | 42 |
| 400 mm. Hg | | 177 | 51 |
| 600 mm. Hg | | 192 | 53 |
| Trans-Decalin | 187 | | |
| 50 mm. Hg | | 95 | 14 |
| 200 mm. Hg | | 136.5 | 20 |
| 600 mm. Hg | | 175.5 | 28 |

According to the provisions of the patent statutes, we have explained the principle, preferred construction, and mode of operation of our invention and have illustrated adn described what we now consider to represent its best embodiment. However, we desire to have it understood that, within the scope of the appended claims, the invention may be practiced otherwise than as specifically illustrated and described.

We claim:

1. In a method of purifying an impure phenolic mixture containing m,p-cresol and close boiling phenols, the steps of subjecting said mixture to distillation in the presence of a hydrocarbon boiling between 150 and 250° C. in an amount at least sufficient to form an azeotrope with the m,p-cresol, recovering an overhead predominating in the azeotrope of m,p-cresol, and thereafter recovering the m,p-cresol from said azeotrope.

2. The method according to claim 1 in which the hydrocarbon is a straight-chain paraffin hydrocarbon in the range of $C_{10}$ to $C_{13}$.

3. The method according to claim 1 in which the hydrocarbon is a mixture containing principally straight-chain paraffin hydrocarbons in the range of $C_{10}$ to $C_{13}$.

4. The method according to claim 1 in which the m,p-cresol is recovered from its azeotrope by treatment with aqueous methanol.

5. The method according to claim 1 in which any o-cresol in the impure phenolic mixture is first removed by fractional predistillation.

References Cited

UNITED STATES PATENTS

| | | | |
|---|---|---|---|
| 2,382,142 | 8/1945 | Engel | 260—621 |
| 2,684,388 | 7/1954 | Sullivan et al. | 260—621 |
| 2,789,146 | 4/1957 | Neuworth | 260—621 |
| 3,031,383 | 4/1962 | Millikan | 203—79 |

NORMAN YUDKOFF, *Primary Examiner.*

W. L. BASCOMB, *Assistant Examiner.*

UNITED STATES PATENT OFFICE
CERTIFICATE OF CORRECTION

Patent No. 3,337,424                      August 22, 1967

Martin B. Neuworth et al.

It is hereby certified that error appears in the above numbered patent requiring correction and that the said Letters Patent should read as corrected below.

Column 3, TABLE II, in the title, line 1, for "COMPOSITION" read -- COMPOSITION[1] --; same TABLE II, the heading to the second column, upper and lower portion thereof, should be lowered to be in line with the boiling points of the phenols; same TABLE II, in the lower portion, fifth column, line 3 thereof, for "133" read -- 113 --; column 4, line 47, after "and" insert -- no --.

Signed and sealed this 27th day of August 1968.

(SEAL)
Attest:

Edward M. Fletcher, Jr.                      EDWARD J. BRENNER
Attesting Officer                            Commissioner of Patents